BEST AVAILABLE COPY

40/309

Oct. 28, 1924.

J. W. LITTLE, JR

Re. 15,939

END LABEL FOR CLOTH BOLTS

Original Filed Feb. 23, 1923

Inventor

John W. Little, Jr.

By Horace G. Seitz

Attorney

Reissued Oct. 28, 1924. Re. 15,939

UNITED STATES PATENT OFFICE.

JOHN W. LITTLE, JR., OF PAWTUCKET, RHODE ISLAND.

END LABEL FOR CLOTH BOLTS.

Original No. 1,481,293, dated January 22, 1924, Serial No. 620,691, filed February 23, 1923. Application for reissue filed April 25, 1924. Serial No. 709,065.

*To all whom it may concern:*

Be it known that I, JOHN W. LITTLE, Jr., a citizen of the United States, residing at Pawtucket, in the county of Providence and State of Rhode Island, have invented certain new and useful Improvements in End Labels for Cloth Bolts, of which the following is a specification.

My invention relates to improvements in end labels for cloth bolts, and the purpose of my invention is to provide a foldable label which can be readily attached to a bolt of cloth in such a manner as to display at the end of said cloth bolt a tab or label for printed matter and having a tongue capable of insertion between the folds of cloth in the bolt. Another purpose of my invention is to provide a label capable of being attached to the tongue as aforesaid, but which may be folded almost perfectly flat so as to admit of being packed and shipped in a compact carton or package.

My invention is disclosed in the accompanying drawings in which—

Figure 1:
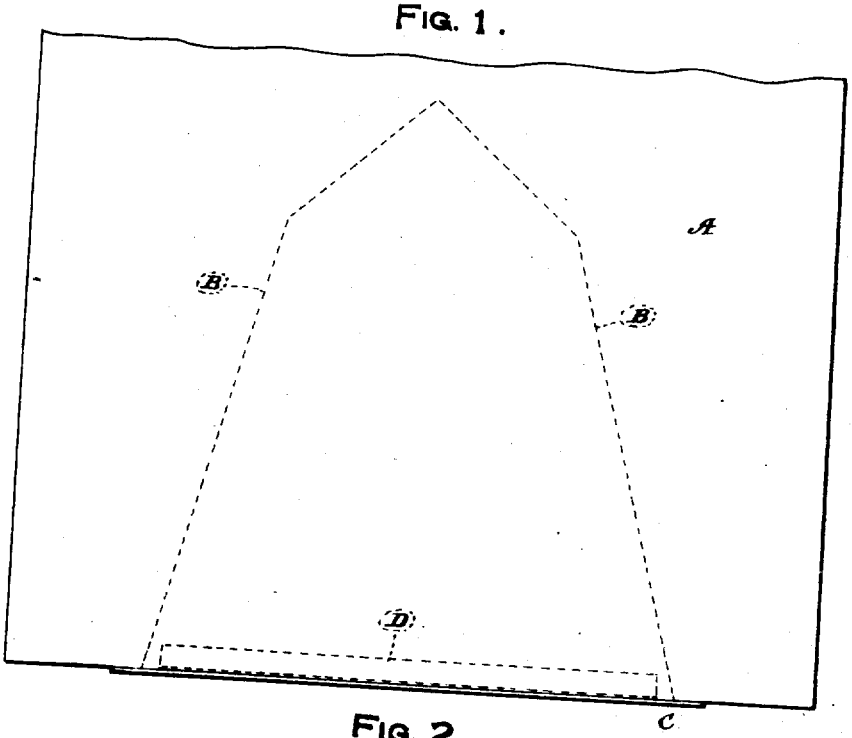

Figure 1 represents a plan view of a portion of a bolt of cloth with the tongue of my label inserted therein.

Figure 2:
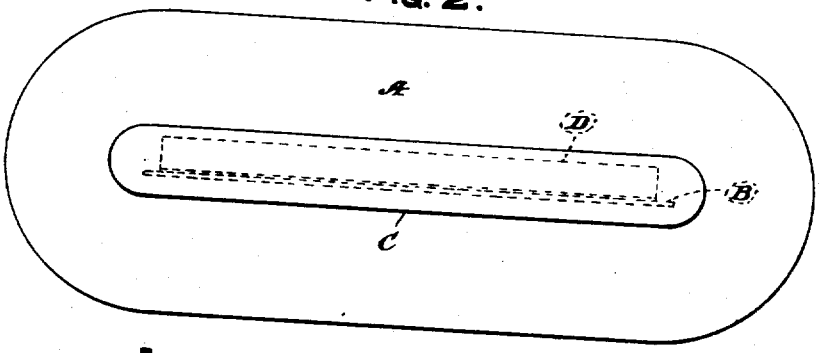

Figure 2, an end view of said bolt showing the display tab of my label.

Figure 3:
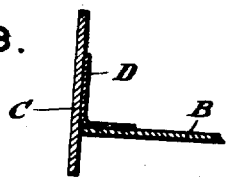

Figure 3, a cross-section of said tab and a portion of the tongue with the member connecting the two.

Figure 4:
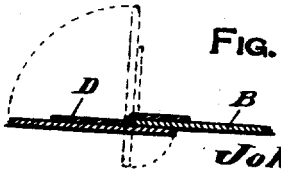

Figure 4, a like sectional view showing the tab folded in approximately the same plane with the tongue.

The same parts are referred to by the same letters throughout the various views.

In Figure 1, A is a plan view of a portion of a bolt of cloth which is rolled in the usual manner as bolts are taken from the folding machine or doubler. B, represented by the dotted lines in Figure 1, is the tongue of my label which can be inserted readily between the folds of cloth in the bolt A. C, represents the display tab, which in Figure 1 is shown in a plane at right angles to the end of the bolt A; while D is a strip of flexible cloth or tough paper attached to B and C in such a manner as to permit the tab C to bend easily at various angles with the tongue B.

In Figure 2, the end of the bolt of cloth is seen at A, and the flexible connecting member is shown by the dotted lines D. B in Figure 2 is an end view of the tongue, while C is the display tab.

In the sectional views shown in Figures 3 and 4 the operation of my invention is more clearly seen. In Figure 3 the tongue B is shown at right angles to the display tab C, the two being connected by the flexible member D. This is the position in which the label is used ordinarily on the bolt of cloth, the tongue B being inserted in the bolt as above described.

The full lines in Figure 4 show how my label may be packed for shipment. By reason of the flexibility of the member D, the tab C and the tongue B are brought into approximately the same plane so that a very large number of my labels can be shipped in very compact space without danger of injury.

The tab C may be any size, even large enough to cover the entire end of the bolt.

Another advantage of my label is that when in shops or stores bolts of silk or other fabric are placed in an upright position, my label can be inserted, as above described, and the tab portion C fixed in the same plane with B so that any printing on C will be readily seen.

Also, when there is a slight irregularity in the folding of the bolt, as often occurs, the tab C will serve to conceal such irregularity and improve the appearance of the bolt.

As will be understood, label portion or tab C and the inserted portion or tongue B are connected in such manner that the two portions may be moved relatively to each other on the folding line, between positions in parallel planes and positions in planes at right angles to each other; and that the folding line is located intermediate and spaced from opposite edges of the label portion. This not only permits use of the label in either of such positions, as heretofore pointed out, but also provides that with the tab and tongue in the right angle position and applied to the end of the bolt with the label portion or tab in contact with the bolt, such label portion will be held in a substantially constant plane, due to the fact that the portions of the tab on opposite sides of the folding line oppose each other during any attempt to change the plane. As a result, the label formation has the appearance of a permanently-applied label, although the formation is actually removable and capable of being shifted from one bolt to another.

In addition, the length of the label portion, on the folding line, is generally such as to substantially cover the core of the bolt—the portion of the bolt which includes the initial convolutions and which may include the board or other form of support on which the cloth is wound, the label thus concealing this portion of the bolt. Such length presents a difficulty in service due to the fact that during handling of the bolt the long label portion offers opportunity to exert a leverage action in the label plane, if the ends of the label are free from support, as for instance, where the inserted portion or tongue is of relatively narrow width. In the present invention, this difficulty is met by the use of an inserted portion or tongue in which the overall width at the line of fold connection with the label portion approaches the length of the label portion on such line, the ends of the connection being spaced from the label ends but being in the vicinity of such ends, so that the small distance between an end of the connection and the adjacent label portion end offers substantially no opportunity to set up leverage action independent of the connection, so that the latter offers a support to prevent movement of the label portion in its own plane relative to the inserted or tongue portion.

Not only is this advantage produced by this arrangement, but the increased dimensions of the face set up by this arrangement provide surface dimensions such as to present sufficient friction to maintain the entire label formation in its position in the bolt under ordinary handling conditions without requiring the use of any special retaining structures or formation, shifting of the tongue portion being restrained by reason of the large-dimension surfaces positioned in friction-producing relation to the cloth, etc., of the bolt.

Having thus described my invention, what I claim as new is:—

1. As a means for labelling bolts of cloth, and wherein the label is exposed at the end of the bolt, a label portion adapted to serve as the exposed label, and a tongue hingedly connected with the rear of the label portion with the hinge line intermediate the longitudinal edges of the label portion to permit tongue hinging movements between a position in parallelism with the face plane of the label portion and a position perpendicular to such plane, whereby insertion of the tongue into the bolt a distance sufficient to bring the rear of the label portion into contact with the bolt will cause the label portion to be maintained in a constant plane relative to the bolt.

2. As a means for labelling bolts of cloth, and wherein the label is exposed at the end of the bolt, a label portion adapted to serve as the exposed label, and a tongue hingedly connected with the rear of the label portion with the hinge line intermediate the longitudinal edge of the label portion to permit tongue hinging movements between a position in parallelism with the face plane of the label portion and a position perpendicular to such plane, the facial dimensions of the inserted portion being such as to provide extended surface contact with the cloth and permit maintainance of position of the means solely by friction, whereby insertion of the tongue into the bolt a distance sufficient to bring the rear of the label portion into contact with the bolt will cause the label portion to be maintained in a constant plane relative to the bolt.

3. As a means for labelling bolts of cloth, and wherein the label is exposed at the end of the bolt, a label portion adapted to serve as the exposed label, and a tongue hingedly connected with the rear of the label portion with the hinge line intermediate the longitudinal edges of the label portion to permit tongue hinging movements between a position in parallelism with the face plane of the label portion and a position perpendicular to such plane, the tongue and label portion being normally relatively movable solely on such hinge line, whereby insertion of the tongue into the bolt a distance sufficient to bring the rear of the label portion into contact with the bolt will cause the label portion to be maintained in a constant plane relative to the bolt.

4. As a means for labelling bolts of cloth, and wherein the label is exposed at the end of the bolt, a label portion adapted to serve as the exposed label, and a tongue hingedly connected with the rear of the label portion with the hinge line intermediate the longitudinal edges of the label portion to permit tongue hinging movements between a position in parallelism with the face plane of the label portion and a position perpendicular to such plane, the overall length of such hinge line approaching the length of the label portion to place the ends of the hinge line spaced from but in the vicinity of the ends of the label portion, whereby insertion of the tongue into the bolt a distance sufficient to bring the rear of the label portion into contact with the bolt will cause the label portion to be maintained in a constant plane relative to the bolt.

5. A tag for bolts of cloth comprising a tongue capable of being inserted between the folds of the bolt, a tag for printed matter, and a flexible member united to one transverse edge of said tongue and to the rear face of said tab extending transversely thereof intermediate the upper and lower edges of the same for allowing the tab to be held in a position at right angles to the longitudinal axis of the bolt or in a position projecting longitudinally therefrom.

In testimony whereof I affix my signature in presence of two witnesses.

JOHN W. LITTLE, Jr.

Witnesses:
James L. Jenks,
Edith M. Bromley.